United States Patent [19] [11] 3,916,172

Engle, Jr. [45] Oct. 28, 1975

[54] ELECTRONIC PERPETUAL CALENDAR

[76] Inventor: Ralph L. Engle, Jr., 1 Country Club Lane, Pelham Manor, N.Y. 10803

[22] Filed: Aug. 3, 1973

[21] Appl. No.: 385,316

Related U.S. Application Data

[62] Division of Ser. No. 297,622, Oct. 16, 1972, Pat. No. 3,792,541.

[52] U.S. Cl..... 235/92 PE; 235/92 DM; 235/92 MS; 235/92 DE; 235/92 R

[51] Int. Cl.$^2$ .......................................... H03K 21/36

[58] Field of Search........ 235/92 PE, 92 DE, 92 PL, 235/92 MS, 92 DM, 164, 159

[56] References Cited

UNITED STATES PATENTS

| | | | |
|---|---|---|---|
| 2,834,543 | 5/1958 | Burkhart | 235/159 |
| 3,655,950 | 4/1972 | Greening et al. | 235/92 PL |
| 3,714,393 | 1/1973 | Johnson et al. | 235/92 PL |
| 3,764,784 | 10/1973 | Haner et al. | 235/92 PL |

*Primary Examiner*—Joseph M. Thesz, Jr.
*Attorney, Agent, or Firm*—Norbert P. Holler

[57] ABSTRACT

A compact electronic perpetual calendar, capable of displaying any given monthly or yearly calendar period for any year from 0 to 9,999 in either the Julian or the Gregorian calendar, is disclosed. The apparatus includes a presettable calendar period selector circuit, and a display system control circuit utilizing the logic outputs of the selector circuit for correspondingly activating the display system. The selector circuit may utilize "read only" memories, AND gate matrices, calculator circuitry, or the like to provide the desired logic outputs. This abstract is not to be taken either as a complete exposition or as a limitation of the present invention, however, the full nature and extent of the invention being discernible only by reference to and from the entire disclosure.

10 Claims, 9 Drawing Figures

ELECTRONIC PERPETUAL CALENDAR

This is a division of application Ser. No. 297,622, filed Oct. 16, 1972, now U.S. Pat. No. 3,792,541, issued Feb. 19, 1974.

This invention relates to electronic perpetual calendars.

Printed forms of perpetual calendars, from which the yearly calendars for any given relatively large number of years can be readily determined, are well known. In such a printed form, the calendar for each year by number may be printed in toto, but this will entail a voluminous work if more than a relatively limited span of years is to be covered. On the other hand, the totality of yearly calendars represented may be generalized and thereby reduced to 14 in number, corresponding to the 7 possible ordinary years each starting with a different one of the days of the week, plus the 7 possible leap years each starting with a different one of the days of the week. For such a tabulation, however, it is necessary to provide an elaborate key and cross-reference arrangement to enable the reader to determine which of the 14 illustrations represents the calendar year he is interested in. The layout becomes even more complicated, of course, if it is expanded to cover not only the Gregorian or "New Style" calendar but also the Julian or "Old Style" calendar. Basically, of course, the complications arise from the fact that whereas in the Julian calendar every year divisible by 4, including every century year, is a leap year, this is not so in the Gregorian calendar. In the latter, although as a rule every year divisible by 4 is a leap year, century years are not leap years unless also divisible by 400. Thus, such century years as 1600, 2000, 2400, etc. are leap years in the Gregorian calendar, but not such years as 1800, 1900, 2100, etc.

Electrically operated perpetual or universal calendars are also known, for example such as those represented by U.S. thousands, excluding Pat. Nos. 801,495, 802,346 and 2,791,850. The type of apparatus disclosed in the first two of these patents is a coin-operated system designed to enable the operator to determine on what day of the week any given date since the advent of the Gregorian calendar fell, but the system is incapable of presenting to the viewer any calendar period covering more than one day. The type of apparatus disclosed in the third of these patents is, on the other hand, designed to enable any desired monthly calendar period of the Gregorian calendar to be visualized. To this end, such an apparatus entails the provision of a matrix of calendar day numbers printed on a translucent screen and each associated with an individual light source located behind the screen, a switching system being provided to permit only those lights to be energized which are located behind the precise groups of numbers to be illuminated. Although this type of calendar is somewhat more versatile than the first one described above, it too does not admit of the visualization of full calendar year periods, and the limitations of the switching system makes it relatively impractical to cover more than a limited number of years. Neither of the two types of electric perpetual calendars, of course, has the capability of visualizing a yearly calendar period for both the Julian and the Gregorian calendars or a monthly calendar period for the Julian calendar.

It is the basic object of the present invention, therefore, to provide a novel electronic perpetual calendar which is free of the drawbacks and disadvantages of the known types of perpetual calendars.

More particularly, it is an important object of the present invention to provide an electronic perpetual calendar which can be used to visualize both monthly and yearly calendar periods falling within extremely large spans of years for both the Gregorian and Juian calendars, Julian is substantially fool-proof in operation, and which can be constructed in a compact form, lending itself to desk-top use as well as to production at relatively low cost, through the use of integrated circuits.

Generally speaking, the objectives of the present invention are attained by an apparatus which includes a presettable calendar period selector circuit, a calendar period display system, and a display system control circuit utilizing the logic outputs of the selector circuit, corresponding to any desired yearly and/or monthly calendar period, for activating the display system. In the presently contemplated best mode of the apparatus, the display system includes a 43-fame photographic film strip carrying in 42 consecutive frames (following a first blank or reference frame) the respective images of the possible monthly and yearly calendar periods. The number 42 derives from the fact that there are 14 possible yearly calendars covering regular years and leap years each of which may start on a different day of the week, and 28 possible monthly calendars covering months of 28, 29, 30 and 31 days each of which may start on a different day of the week. The display system further includes a stepping motor operatable to drive the film so as to enable any selected one of the frames to be positioned for projection of the respective calendar period image onto a viewing screen. The selector circuit includes a series of switch-controlled Johnson decade counters for providing signals corresponding to any year date from the year 0 to the year 9,999. To operate the stepping motor, the selector circuit is preset so as to cause the required year date signals, or the month signals if desired, to be applied to the appropriate address registers of a pair of "read only" memories, the outputs of which are applied to the display system control circuit so as to activate a pair of 6-bit binary downcounters. The latter in turn provide respective outputs for first driving the stepping motor in one direction to bring the film to a zero state, where the blank or reference frame is located in the projection system, and for then driving the motor in the opposite direction to advance the film to a counted-out state in which the desired frame of the film, depicting the calendar period that is to be viewed, is positioned in the projection system.

In lieu of "read only" memories, of course, the selector circuit may utilize AND gate matrices of either the diode or the transistor type, electronic calculator circuitry, or the like, to which the switch-controlled inputs are applied and the outputs of which are applied to the control circuit. By the same token, individual film transparencies or other graphic representations of the different calendar periods may be used in lieu of a film strip, and the number of calendar periods depicted may be other than 42. Also, the calendar periods may be visualized in still other forms of graphic representations, e.g. by means of a cathode ray tube, a liquid crystal display, a plasma display, a monolithic display, etc.

The foregoing and other objects, characteristics and advantages of the present invention will be more clearly understood from the following detailed description thereof when read in conjunction with the accompanying drawings, in which.

Figure 3:
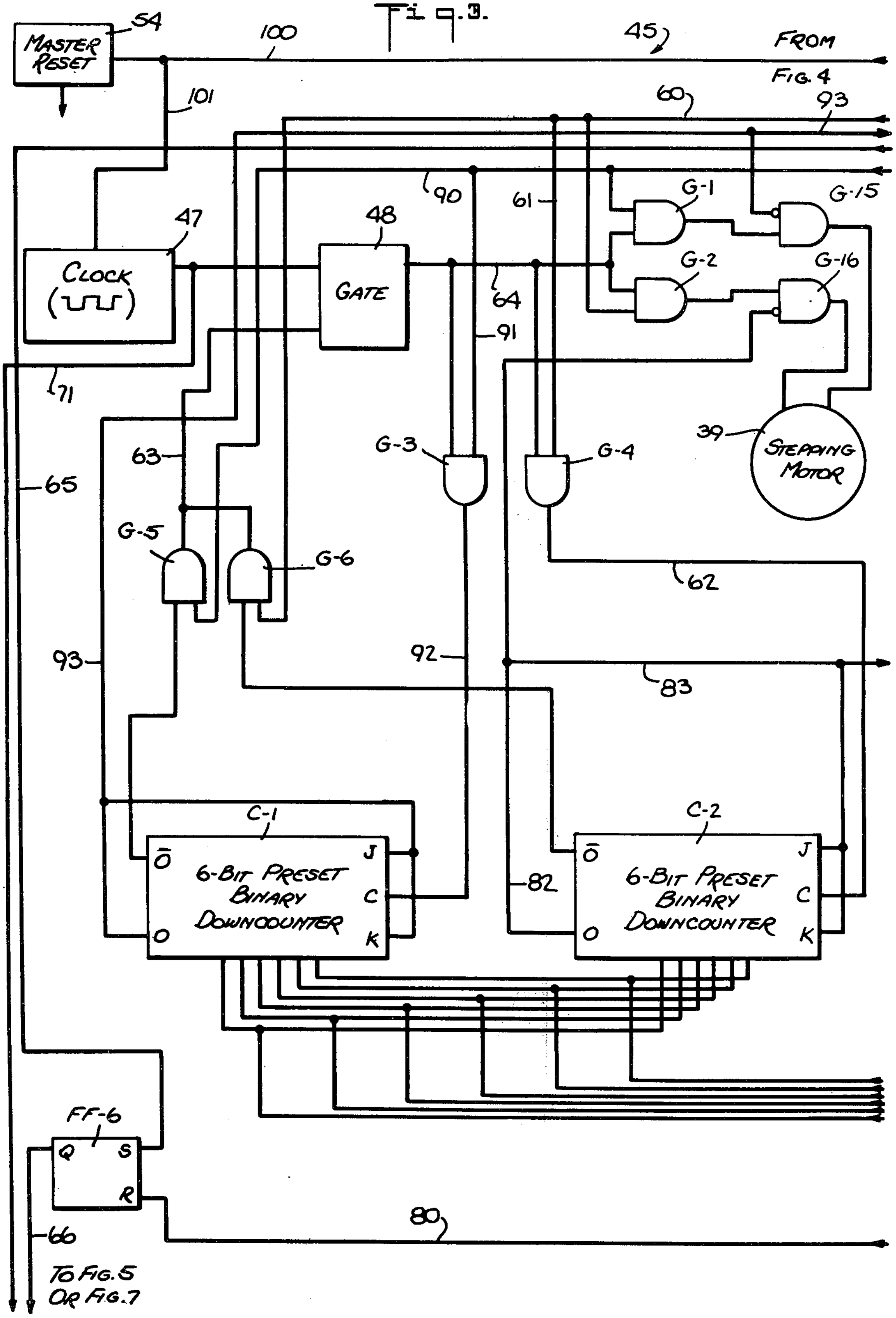
Figure 4:
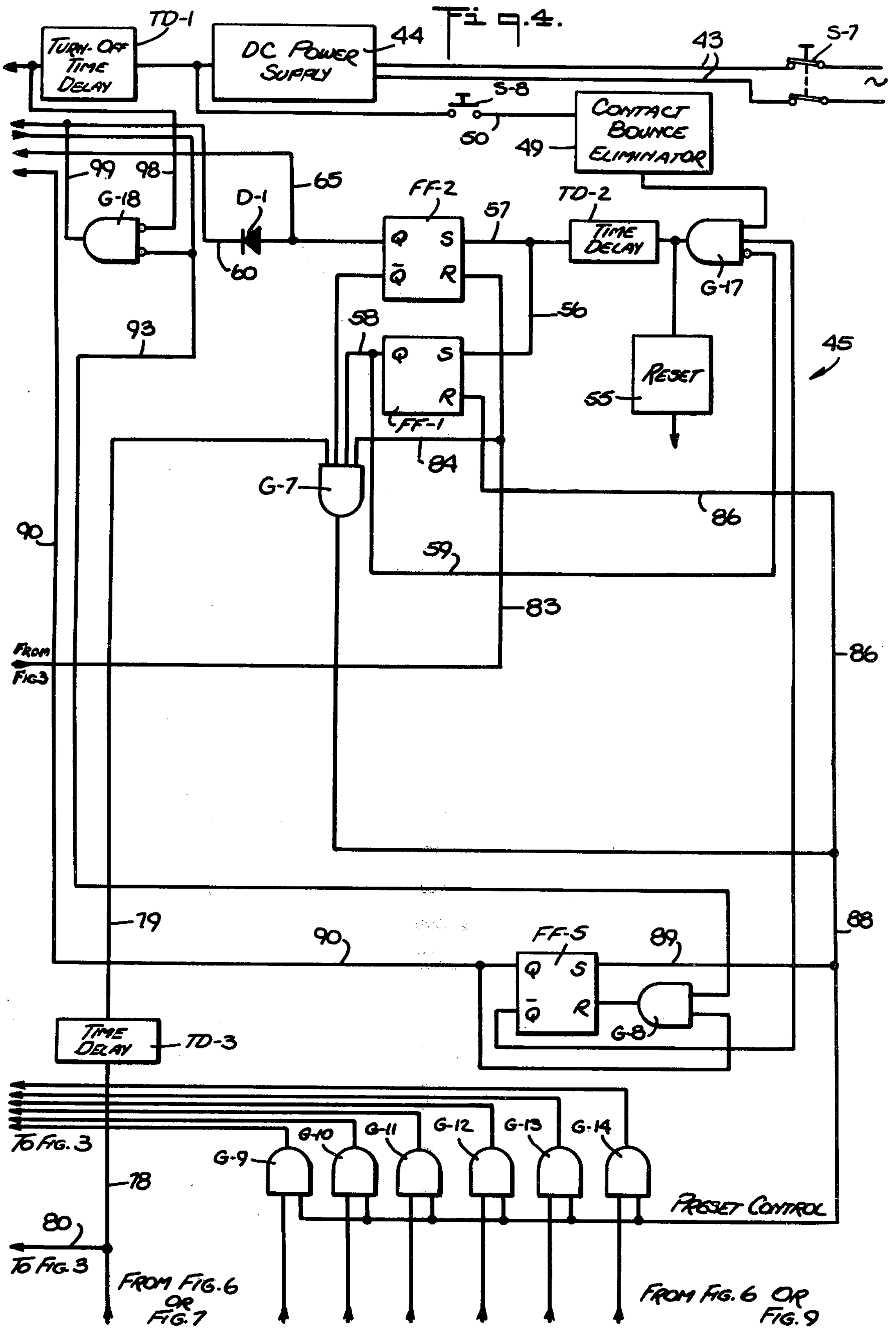
Figure 5:
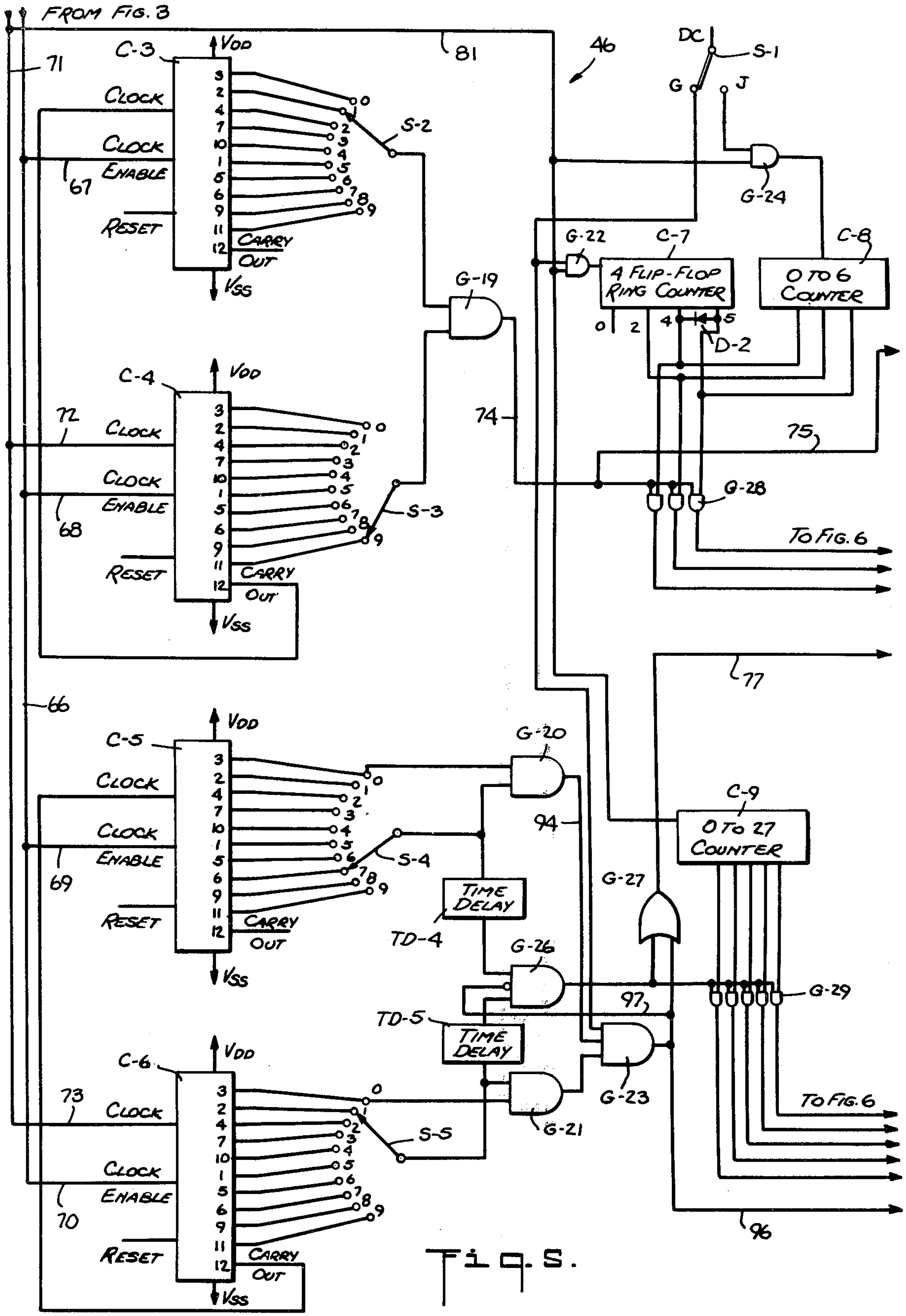
Figure 6:
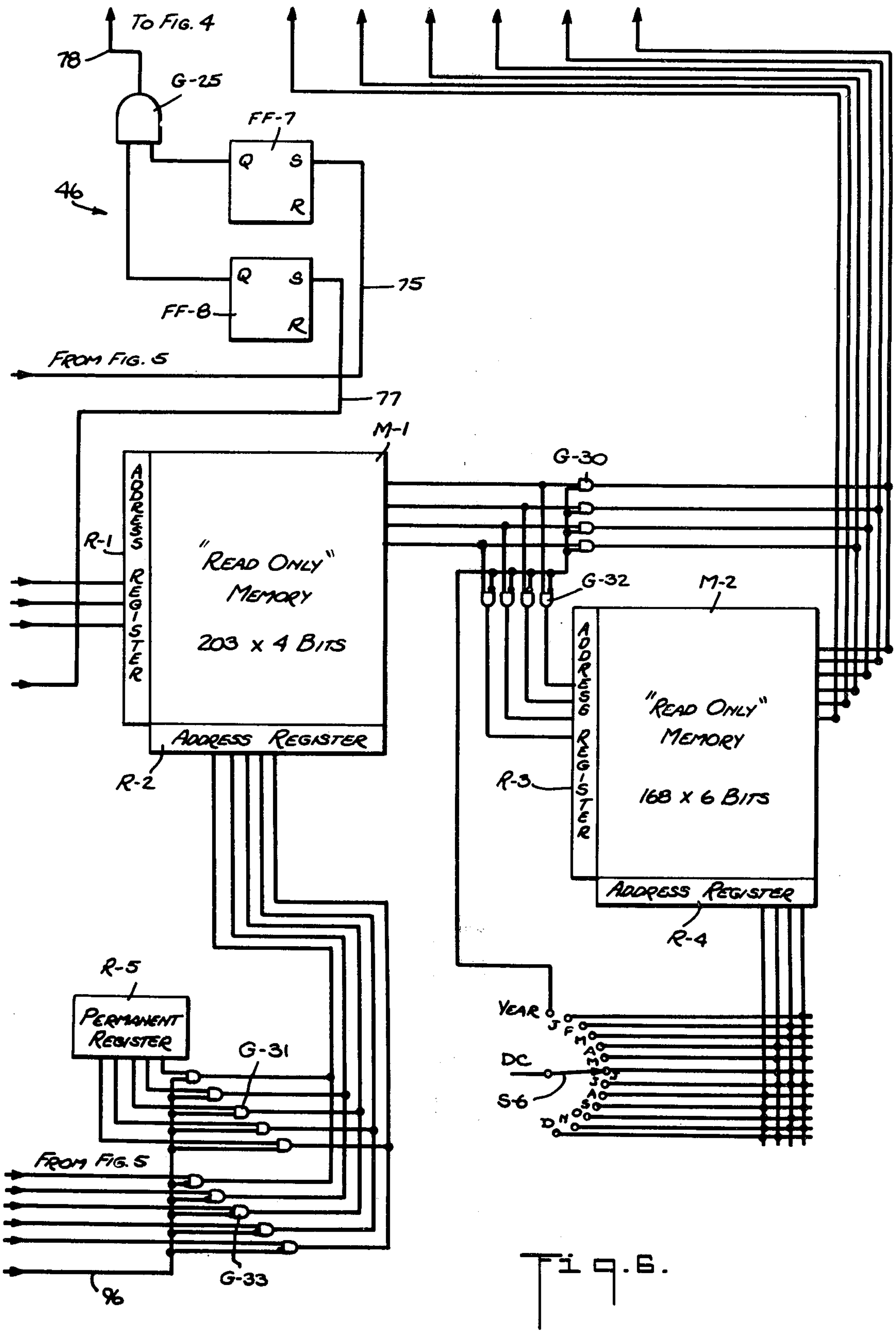
Figure 7:
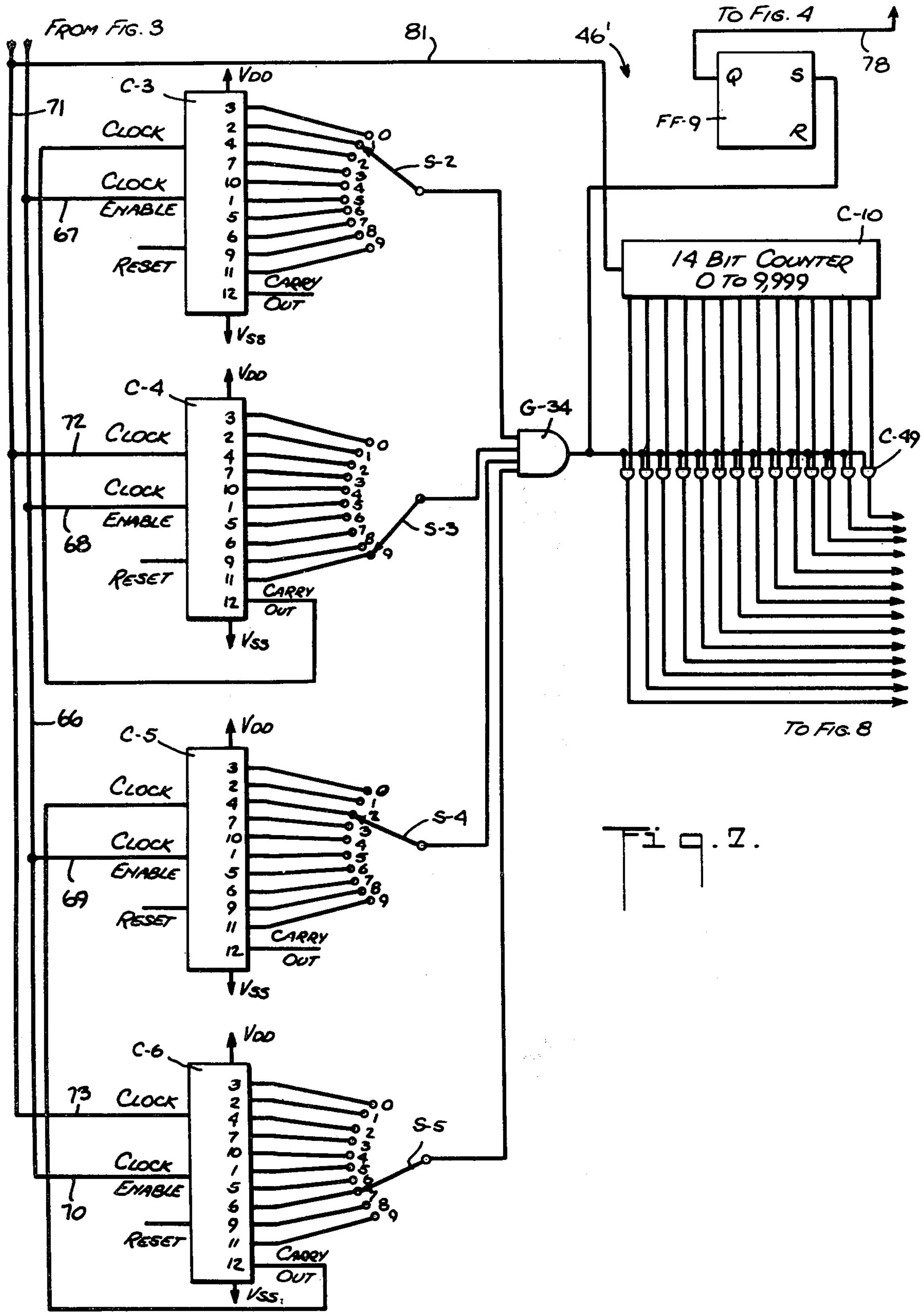

FIGS. 3 and 4 together illustrate the display system control circuit for the electronic perpetual calendar of the present invention, and are to be viewed with FIG. 3 to the left of FIG. 4;

FIGS. 5 and 6 together illustrate a "read only" memory type of calendar period selector circuit for a perpetual calendar according to the present invention, and are to be viewed with FIG. 5 to the left of FIG. 6 and with the two figures below FIGS. 3 and 4, respectively; and FIGS. 7, 8 and 9 together illustrate a calculator type of calendar period selector circuit for a perpetual calendar according to the present invention, and are to be viewed with FIG. 7 to the left and FIG. 9 to the right of FIG. 8, and with FIGS. 7 and 9 below FIGS. 3 and 4, respectively.

For purposes of greatest comprehensiveness, the following detailed description of representative embodiments of the present invention will be directed to a perpetual calendar capable of providing individual graphic representations of 42 different calendar periods, i.e. (as previously stated) the total group of 14 possible yearly calendars and 28 possible monthly calendars, covering all years from the year 0 to the year 9,999. Nevertheless, it should be understood that the basic principles of the invention apply just as well to a perpetual calendar capable of providing fewer or more than 42 representations, for example, only the 28 monthly calendar periods, or only the 14 yearly calendar periods, or in addition to those certain others such as quarterly or semiannual yearly calendar periods, etc., and by the same token the span of years covered could be considerably less than 9,999. In any such apparatus, of course, each available representation will be identified by a code number so that suitable logic circuitry (digital or analog) can be provided to generate suitable signals for activating a display system so as to bring into view the particular calendar period desired to be inspected. In the form of perpetual calendar according to the present invention to be hereinafter described, therefore, each calendar period is represented by a code number from 1 to 42. Although this can be done in any desired manner, for the purpose of the following description the code will be that set forth in Table I.

TABLE I

| Code No. | Calendar Period | Starting Day | Code No. | Calendar Period | Starting Day |
|---|---|---|---|---|---|
| 1 | Reg. Year | Sunday | 22 | 30-day Mo. | Sunday |
| 2 | " | Monday | 23 | " | Monday |
| 3 | " | Tuesday | 24 | " | Tuesday |
| 4 | " | Wednesday | 25 | " | Wednes-day |
| 5 | " | Thursday | 26 | " | Thursday |
| 6 | " | Friday | 27 | " | Friday |
| 7 | " | Saturday | 28 | " | Saturday |
| 8 | Leap Year | Sunday | 29 | 28-day Mo. | Sunday |
| 9 | " | Monday | 30 | " | Monday |
| 10 | " | Tuesday | 31 | " | Tuesday |

TABLE I-Continued

| Code No. | Calendar Period | Starting Day | Code No. | Calendar Period | Starting Day |
|---|---|---|---|---|---|
| 11 | " | Wednesday | 32 | " | Wednes-day |
| 12 | " | Thursday | 33 | " | Thursday |
| 13 | " | Friday | 34 | " | Friday |
| 14 | " | Saturday | 35 | " | Saturday |
| 15 | 31-day Mo. | Sunday | 36 | 29-day Mo. | Sunday |
| 16 | " | Monday | 37 | " | Monday |
| 17 | " | Tuesday | 38 | " | Tuesday |
| 18 | " | Wednesday | 39 | " | Wednes-day |
| 19 | " | Thursday | 40 | " | Thursday |
| 20 | " | Friday | 41 | " | Friday |
| 21 | " | Saturday | 42 | " | Saturday |

In general, therefore, the apparatus will include a 2-position selector switch for the type of calendar, i.e. Gregorian or Julian, desired, four year number selector switches each with 10 positions corresponding to the thousands, hundreds, units and tens digits of the calendar year number, and a month selector switch with 13 positions, 12 for the 12 months and a thirteenth for excluding the month-related logic circuitry if a yearly rather than a monthly calendar is to be displayed. When these switches are properly set for a given calendar period, the resultant signals are used to derive first output signals corresponding to the appropriate code number which can then be used so as to provide suitable second output signals for activating the display system so as to bring the desired calendar period into view.

Since the device may be used to display the calendar of either any given year or of a particular month in a given year, one of the problems that must be faced is how best to provide signals corresponding to the 10,000 different years to be covered. This problem can be readily handled by considering the first two digits of the year number separately from the lst two digits, i.e. to consider the overall year number to be composed of two separate numbers, one made up of the thousands and hundreds digits and one made up of the tens and units digits. Thus, the year 1945 would be considered as broken into two numbers, 19 and 45. It can be readily shown that with this approach, three important cycles exist.

1. With respect to the thousands and hundreds digits for the Gregorian calendar, a cycle is completed every four numbers, and the components of the cycle can be designated by the symbols 0, 1, 2, and 3.

2. With respect to the thousands and hundreds digits for the Julian calendar, there is a similar cycle which is completed every seven numbers and the components of which can be designated by the symbols 0, 1, 2, 3, 4, 5 and 6. Of these, the 0 component of the Julian cycle is equivalent to the 0 component of the Gregorian cycle, the 2 component of the Julian cycle is equivalent to the 1 component of the Gregorian cycle, the 4 component of the Julian cycle is equivalent to the 2 component of the Gregorian cycle, and the 5 component of the Julian cycle is equivalent to the 3 component of the Gregorian cycle.

3. With respect to the tens and units digits of both the Julian and Gregorian calendars, with one exception, a cycle is completed every 28 numbers the components of which can be designated by the symbols 0, 1, 2, 3, 4...27. The exception, which requires the provision of special means to be discussed hereinafter, is that the cycle does not hold true for the number 00 in the Gregorian calendar.

To illustrate the application of the foregoing principles to the calculation of the cycle components for any given calendar year, the year 1945 in the Gregorian calendar, for example, may be considered as composed of two numbers 19 and 45, as previously stated, of which the number 19 falls into the group cycling every 4 numbers while the number 45 falls into the group cycling every 28 numbers. The component of the particular cycle involved is found by dividing the number by the repeat number of the cycle, with the remainder being the component of the cycle. Thus, the cycle component for the number 19 is 3 (19 divided by 4 gives a remainder of 3), and the cycle component for the number 45 is 17 (45 divided by 28 gives a remainder of 17). With these two components, it becomes a simple matter to access a relatively small table set up as a "read only" memory or equivalent circuitry to provide output signals representing the desired yearly calendar, i.e. 1945 (Gregorian).

To find a specific month of a given calendar year, with the year cycle components determined as above, is then also very simple. Since there are only 14 possible yearly calendars and each of those has 12 possible months, there are 168 (14 times 12) possible combinations which, as those skilled in the art will readily recognize, is also a relatively small table to set up as a "read only" memory or equivalent circuitry.

It will be understood, that in both the yearly and monthly calendar determinations described, the end result can be achieved by calculator type circuitry rather than by "read only" memories or the like.

Figure 1:
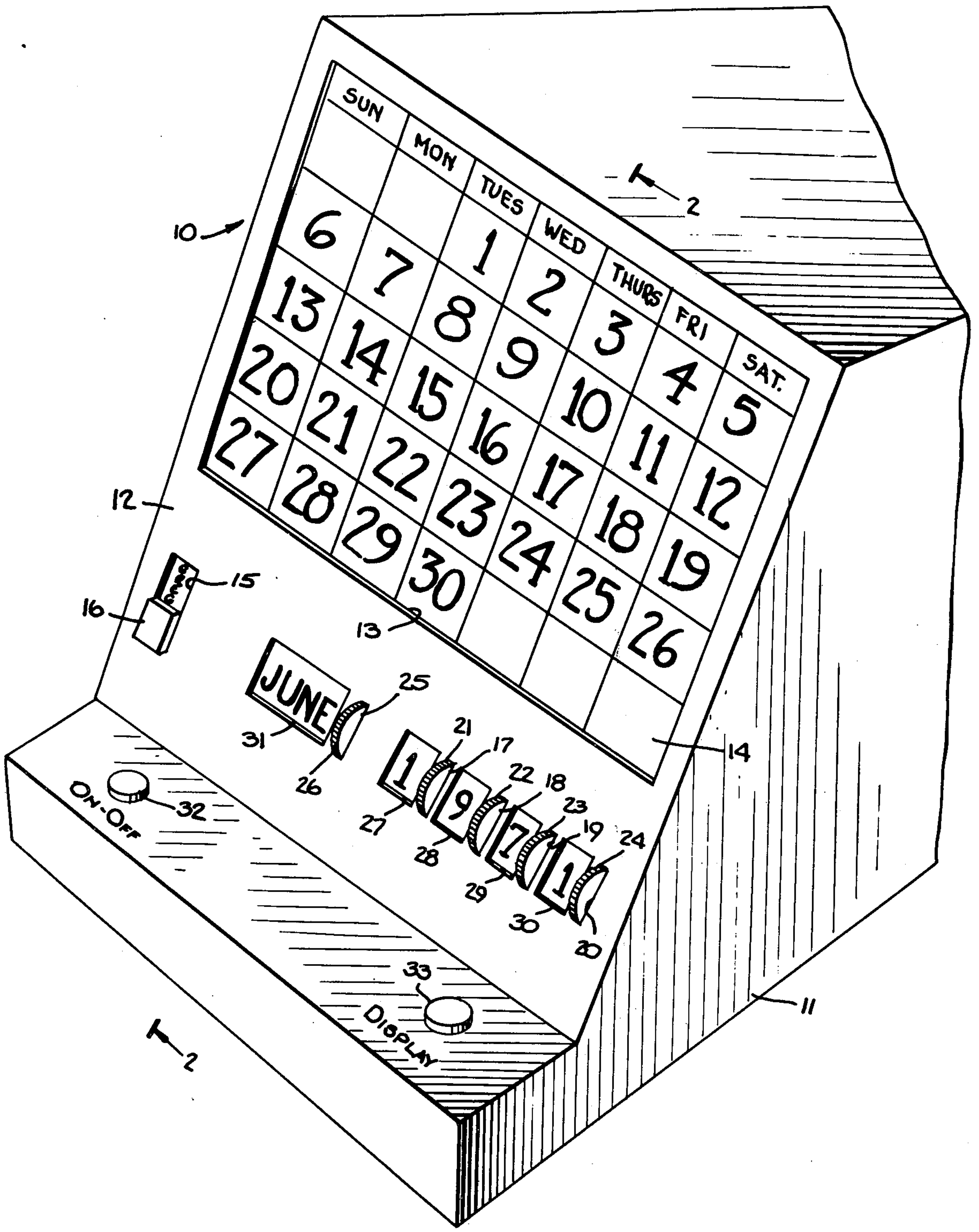
FIG. 1 is a fragmentary, perspective view of a perpetual calendar according to one embodiment of the present invention and is illustrated as having been operated to visualize the month of June, 1971 in the Gregorian calendar.
Figure 2:
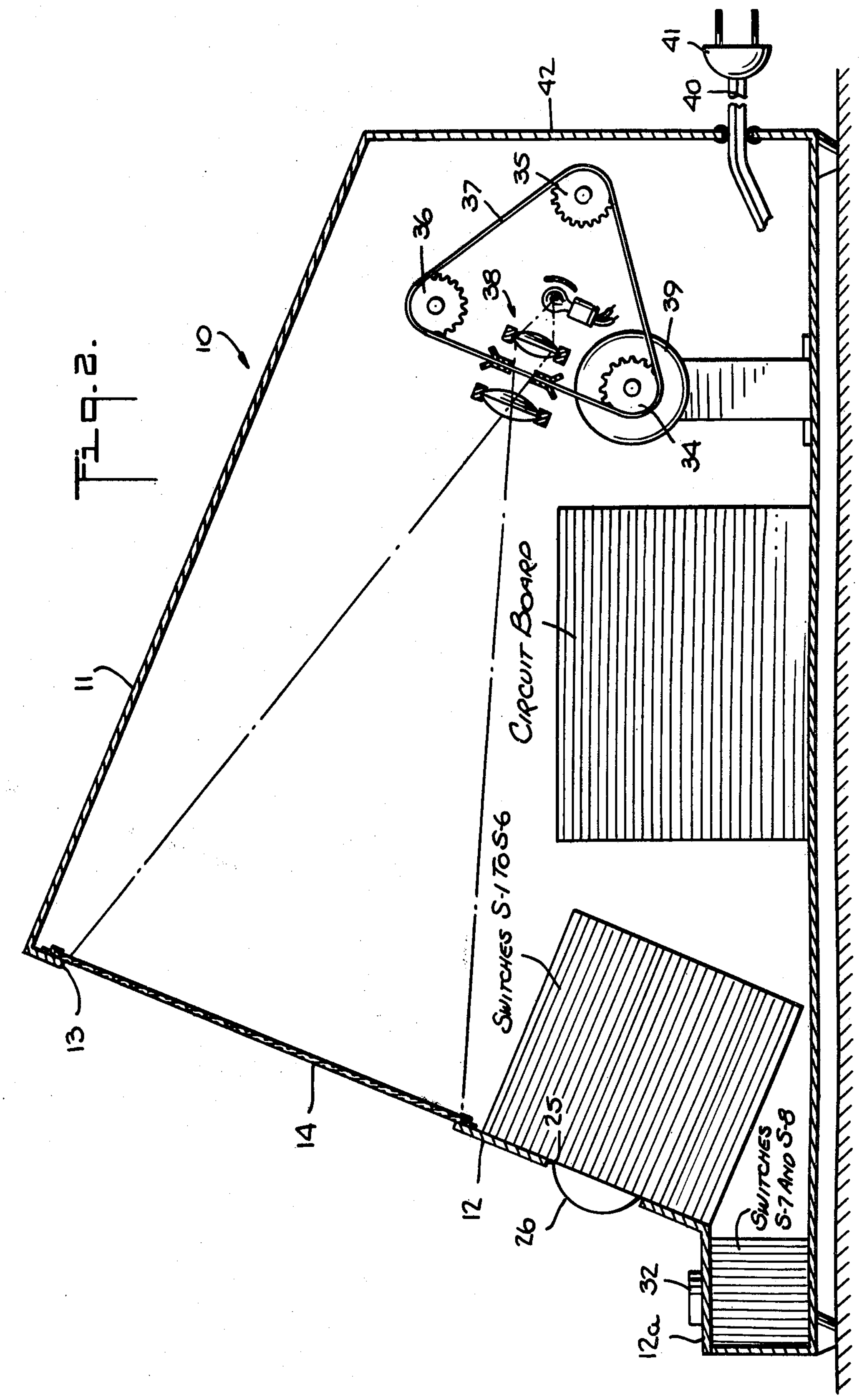
FIG. 2 is a fragmentary, partly schematic, sectional view taken along the line 2—2 in FIG. 1.

Referring now to the drawings in greater detail, a perpetual calendar 10 (FIGS. 1 and 2) according to the present invention is shown as comprising a housing 11 made of metal or of a suitable synthetic plastic material, such as ABS resin, in sheet form. The housing preferably is sufficiently small to be placed on a table or desk, but it may be constructed in larger forms, as a console or a part of a cabinet, etc. The front wall 12 of the housing 11 is provided in its upper region with a large rectangular opening 13 and supports, over the entire expanse of the latter, a conventional transluscent or milk glass plate 14 consituting a screen onto which the calendar period to be displayed can be projected.

The front wall of the housing below the projection screen is further provided: with an opening 15 accommodating the slide actuating member 16 of a single-pole double-throw calendar type selector switch, designated S-1 in FIGS. 5 and 8; with four openings 17, 18, 19 and 20 accommodating the thumbwheel actuators 21, 22, 23 and 24 of a set of rotary year number selector switches, designated S-2 to S-5 in FIGS. 5 and 7, having 10 positions each for the thousands, hundreds, tens and units digits of the calendar year number; and with an opening 25 accommodating the thumbwheel actuator 26 of a rotary selector switch, designated S-6 in FIGS. 6 and 9, having 13 positions, twelve for the months of the year and one for enabling the month address register and memory to be bypassed (as will be explained more fully hereinafter) if a yearly calendar is to be displayed. Arranged adjacent the thumbwheel switch actuators 21 to 24 are respective windows 27 to 30 through which tapes or like index members geared to the thumbwheels and carrying the year number digits can be viewed. Similarly, a window 31 is arranged adjacent the thumbwheel switch actuator 26 through which a tape or like index member geared to the thumbwheel and carrying the word "YEAR" and the names of the months of the year can be viewed. Also accessible at the front of the housing 11, on a horizontal extension 12*a* of the front wall 12 thereof, are a pushbutton actuator 32 for a toggle-type double-pole, single-throw "ON-OFF" switch, designated S-7 in FIG. 4, and a pushbutton actuator 33 for a momentary type display system activating switch, designated S-8 in FIG. 4.

Arranged within the housing 11 (and only schematically illustrated in FIG. 2) are the electrical elements of the selector switches S-1 to S-6 and of the pushbutton switches S-7 and S-8, a circuit board containing, in any suitable form, the DC power supply and the logic circuitry for the apparatus, and the optical and mechanical elements of the calendar period display system. The latter is shown as including a set of sprockets 34, 35 and 36 supporting and guiding a photographic film strip 37 (e.g. 8 mm. motion picture film) which is divided into forty-three frames, one a blank or reference frame and the other containing the images of the forty-two calendar periods to be displayed, an optical projection system 38 throug which the film can be moved for projecting individual frames onto the screen 14, and a stepping motor 39 drivingly connected to the sprocket 34 for shifting the film strip 37 one frame at a time. The connections between the various electrical components are not shown in FIG. 2. A conventional electric cord 40 having a plug 41 is shown as extending out of the housing 11, for example through the rear wall 42 thereof, to enable AC power to be led to the circuitry of the apparatus. The AC input line 43 to the DC power supply 44 (FIG. 4), which provides DC power for all circuits, is controlled by the ON-OFF switch S-7. The entire unit may, of course, be powered by a DC battery or the like located in the housing and without the need for an exterior AC connection.

As previously mentioned, the calendar includes a display system control circuit 45 (FIGS. 3 and 4) and, in accordance with one embodiment of the invention, a "read only" memory type calendar period selector circuit 46 (FIGS. 5 and 6). The display system control circuit includes: flip-flops FF-1, FF-2 and FF-5 (FIG. 4) and a flip-flop FF-6 (FIG. 30; time delays TD-1, TD-2 and TD-3 (FIG. 4) of which the first is a turn-off time delay; a clock pulse generator 47 (shown as a square wave oscillator) and an oscillator output circuit gate 48 (FIG. 3); two 6-bit preset binary downcounters C-1 and C-2 (FIG. 3); a plurality of AND gates G-1 to G-6 (FIG. 3) and G-7 to G-14 (FIG. 4); a plurality of differential input AND gates G-15 and G-16 (FIG. 3) and G-17 (FIG. 4); a negative input AND gate G-18 (FIG. 4); and a diode D-1 (FIG. 4) connected to the Q output of flip-flop FF-2. The oscillator output circuit gate 48 is, for example, a NAND gate configuration of the type shown in "Digital Electronics for Scientists" by H. V. Malmstadt and C. G. Enke (W.A. Benjamin, Inc., New York, 1969), page 226. A contact bounce eliminator 49 is incorporated in line 50 between the display-activating switch S-8 and the differential input AND gate G-17.

The calendar period selector circuit 46 includes; flip-flops FF-7 and FF-8 (FIG. 6); four 5-stage Johnson decade counters C-3 to C-6 (FIG. 5); a plurality of counters C-7 to C-9 (FIG. 5), the first of these being a ring counter (4 flip-flops) which has the effect of dividing by 4 and giving the remainders of 0, 1, 2 or 3 in the form of respective code numbers 5, 0, 2 and 4, the second being a counter which has the effect of dividing by 7 and giving the remainders 0, 1, 2,....or 6, and the third being a counter which has the effect of dividing by 28 and giving the remainders of 0, 1, 2,....or 27; a 203×4 bit "read only" memory M-1 having address registers R-1 and R-2, and a 168×6 bit "read only" memory M-2 having address registers R-3 and R-4 (FIG. 6); a permanent register R-5 (FIG. 6); a plurality of AND gates G-19 to G-24 (FIG. 5) and G-25 (FIG. 6); a differential input AND gate G-26 (FIG. 5); time delays TD-4 and TD-5 (FIG. 5); an OR gate G-27 (FIG. 5); a diode D-2 (FIG. 5) connected between the 4 and 5 outputs of the counter C-7; multiple AND gate sets G-28 and G-29 (FIG. 5) and G-30 and G-31 (FIG. 6); and multiple differential input AND gate sets G-32 and G-33 (FIG. 6). It will be understood, of course, that the counters C-3 to C-6 may be any type of decade counter provided with ten decoded decimal outputs. Also, although the various circuits shown are of the binary type, some or all of them could be operated in other codes, e.g. binary coded decimal, etc.

The calendar circuitry in general also includes a first monostable multivibrator 54 (FIG. 3) serving as a master reset, i.e. to reset all flip-flops, non-permanent registers and counters to ensure that they all start in the proper state, and a second monostable multivibrator 55 (FIG. 4) serving as a supplementary reset, i.e. to reset all flip-flops and nonpermanent registers and all counters except the second downcounter C-2.

The operation of the perpetual calendar according to the embodiment of the present invention illustrated in FIGS. 1 to 6 will now be explained in connection with a description, by way of example, of the procedure for obtaining a display of the monthly calendar for June 1971 (Gregorian). It is assumed as a starting condition that the ON-OFF switch S-7 is closed (as shown) and that a prior viewing operation has been in progress. Merely by way of example, let it be assumed that the calendar for February 1972 (Gregorian) has been displayed. The switch S-1 thus is in its G position (FIG. 5), and the stepping motor 39 has been operated to dispose the thirty-eighth frame of the film strip 37 in the projection system 38 (this is seen from Table I above which shows the code number 38 for a 29-day month starting on a Tuesday). The code numbers for the various yearly and monthly calendar periods are stored in the "read only" memories M-1 and M-2 in accordance with the plan represented by the following Tables II and III, respectively, the code numbers 1 to 14 being stored in memory M-1 for accessing by address registers R-1 and R-2, and the code numbers 15 to 42 being stored in memory M-2 for accessing by address registers R-3 and R-4.

TABLE II

READ ONLY MEMORY M-1

| | | Memory Address Register R-1 | | | | | | |
|---|---|---|---|---|---|---|---|---|
| | | 0 | 1 | 2 | 3 | 4 | 5 | 6 |
| | 0 | 12 | 11 | 10 | 9 | 8 | 14 | 13 |
| | 1 | 7 | 6 | 5 | 4 | 3 | 2 | 1 |
| | 2 | 1 | 7 | 6 | 5 | 4 | 3 | 2 |
| | 3 | 2 | 1 | 7 | 6 | 5 | 4 | 3 |
| | 4 | 10 | 9 | 8 | 14 | 13 | 12 | 11 |
| | 5 | 5 | 4 | 3 | 2 | 1 | 7 | 6 |
| | 6 | 6 | 5 | 4 | 3 | 2 | 1 | 7 |
| Memory | 7 | 7 | 6 | 5 | 4 | 3 | 2 | 1 |
| | 8 | 8 | 14 | 13 | 12 | 11 | 10 | 9 |
| | 9 | 3 | 2 | 1 | 7 | 6 | 5 | 4 |
| | 10 | 4 | 3 | 2 | 1 | 7 | 6 | 5 |
| | 11 | 5 | 4 | 3 | 2 | 1 | 7 | 6 |
| | 12 | 13 | 12 | 11 | 10 | 9 | 8 | 14 |
| | 13 | 1 | 7 | 6 | 5 | 4 | 3 | 2 |
| Address | 14 | 2 | 1 | 7 | 6 | 5 | 4 | 3 |
| | 15 | 3 | 2 | 1 | 7 | 6 | 5 | 4 |
| | 16 | 11 | 10 | 9 | 8 | 14 | 13 | 12 |
| | 17 | 6 | 5 | 4 | 3 | 2 | 1 | 7 |
| | 18 | 7 | 6 | 5 | 4 | 3 | 2 | 1 |
| | 19 | 1 | 7 | 6 | 5 | 4 | 3 | 2 |
| | 20 | 9 | 8 | 14 | 13 | 12 | 11 | 10 |
| Register R-2 | 21 | 4 | 3 | 2 | 1 | 7 | 6 | 5 |
| | 22 | 5 | 4 | 3 | 2 | 1 | 7 | 6 |
| | 23 | 6 | 5 | 4 | 3 | 2 | 1 | 7 |
| | 24 | 14 | 13 | 12 | 11 | 10 | 9 | 8 |
| | 25 | 2 | 1 | 7 | 6 | 5 | 4 | 3 |
| | 26 | 3 | 2 | 1 | 7 | 6 | 5 | 4 |
| | 27 | 4 | 3 | 2 | 1 | 7 | 6 | 5 |
| | 28 | 6 | | 4 | | 2 | 14 | |

TABLE III

READ ONLY MEMORY M-2

| | | Memory Address Register R-4 | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | 1 | 15 | 32 | 18 | 28 | 16 | 26 | 21 | 17 | 27 | 15 | 25 | 20 |
| | 2 | 16 | 33 | 19 | 22 | 17 | 27 | 15 | 18 | 28 | 16 | 26 | 21 |
| | 3 | 17 | 34 | 20 | 23 | 18 | 28 | 16 | 19 | 22 | 17 | 27 | 15 |
| Memory | 4 | 18 | 35 | 21 | 24 | 19 | 22 | 17 | 20 | 23 | 18 | 28 | 16 |
| | 5 | 19 | 29 | 15 | 25 | 20 | 23 | 18 | 21 | 24 | 19 | 22 | 17 |
| | 6 | 20 | 30 | 16 | 26 | 21 | 24 | 19 | 15 | 25 | 20 | 23 | 18 |
| | 7 | 21 | 31 | 17 | 27 | 15 | 25 | 20 | 16 | 26 | 21 | 24 | 19 |
| Address | 8 | 15 | 39 | 19 | 22 | 17 | 27 | 15 | 18 | 28 | 16 | 26 | 21 |
| | 9 | 16 | 40 | 20 | 23 | 18 | 28 | 16 | 19 | 22 | 17 | 27 | 15 |
| | 10 | 17 | 41 | 21 | 24 | 19 | 22 | 17 | 20 | 23 | 18 | 28 | 16 |
| | 11 | 18 | 42 | 15 | 25 | 20 | 23 | 18 | 21 | 24 | 19 | 22 | 17 |
| Register R-3 | 12 | 19 | 36 | 16 | 26 | 21 | 24 | 19 | 15 | 25 | 20 | 23 | 18 |
| | 13 | 20 | 37 | 17 | 27 | 15 | 25 | 20 | 16 | 26 | 21 | 24 | 19 |
| | 14 | 21 | 38 | 18 | 28 | 16 | 26 | 21 | 17 | 27 | 15 | 25 | 20 |

As the first step of the operation, therefore, the thumbwheel 26 is manipulated to set the month selector switch S-6 to its seventh or "JUNE" position, and the thumbwheels 21, 22, 23 and 24 are manipulated to set the year number selector switches S-2 to S-5 of the Johnson decade counters C-3 to C-6 to their respective 1, 9, 7 and 1 positions. The pushbutton 33 is then depressed to close the momentary switch S-8, which, even though the button 33 is immediately released, will effect the display of the selected new calendar period.

The functioning of the circuitry to this end is as follows:

Initially, the closing of the switch S-8 produces an output from the differential input AND gate G-17 which activates the multivibrator 55 to reset all flip-flops, counters and non-permanent registers except the second downcounter C-2 (the connections for this purpose are not shown but will be clear to those skilled in the art). After a predetermined time delay, controlled by the time delay TD-2 which is set to ensure that the output of the gate G-17 is not passed until all the required resets have taken place, the output of the gate G-17 is applied via lines 56 and 57 to the flip-flops FF-1 and FF-2 to set the same. It will be noted that the presence of the gate G-17 ensures that no viewing sequence can take place until a preceding viewing sequence has been completed. When flip-flop FF-1, which provides an input signal to gates G-7 and G-17 via lines 58 and 59, and flip-flop FF-2 are set, the output from the latter enables the second downcounter C-2 via lines 60, 61 and 62 and AND gate G-4. At the same time, the clock output circuit gate 48 is enabled via lines 60 and 63 and AND gate G-6 to allow a pulse to be applied to the stepping motor 39 via line 64 and gates G-2 and G-16 for every output pulse from the downcounter C-2. The motor thus is stepped, for example in a counterclockwise sense, to shift the film strip 37 so as to bring the reference frame thereof back to the projection system 38, this operation continuing until the downcounter C-2 reaches zero and the motor action is halted by connections to the zero detector output of the downcounter C-2.

Concurrently with the foregoing, flip-flop FF-6 is set via line 65 by the output of flip-flop FF-2 to provide an output enabling the four 5-stage Johnson decade counters C-3 to C-6 via lines 66 and 67 to 70. The pairs of Johnson decade counters C-3/C-4 and C-5/C-6 thus start counting in well-known fashion up to their respective numbers 19 and 71 as pulses are applied to the counters C-4 and C-6 by the clock 47 via the lines 71, 72 and 73 (i.e. each time either of the counters C-4 and C-6 has counted up to 9, on the next pulse its paired counter C-3 or C-5 is advanced one step), so as to provide corresponding output signals via AND gate G-19 and differential input AND gate G-26. The output of gate G-19 is applied via lines 74 and 75 to flip-flop FF-7 to set the same, and the output of gate G-26 is applied via OR gate G-27 and lines 76 and 77 to flip-flop FF-8 to set the same, which in turn causes the output of AND gate G-25 to be applied via lines 78 and 79 and time delay TD-3 to gate G-7, and via lines 78 and 80 to flip-flop FF-6 to reset the same. Together with the respective pairs of decade counters, of course, the associated counters C-7 and C-9 are stepped by the clock pulses via lines 71 and 81 so that, at the ends of the two counting operations, outputs corresponding to the two remainders are provided by these counters. In the present example, these remainders are 3 (19 divided by 4) and 15 (71 divided by 28).

The remainder 3 is applied in the form of a binary code number 4 (used only for purposes of compatibility with the Julian calendar) via the set of AND gates G-28 to address register R-1 of "read only" memory M-1, and the remainder 15 in the direct binary readout form is applied via the set of AND gates G-29 and the set of differential input AND gates G-33 to the address register R-2 of memory M-1. The information needed, i.e. the code number for the year 1971, is stored at the address corresponding to those remainders and is provided as an output from the memory as soon as the memory has been addressed by the registers. Thus, referring to Table II, with 4 and 15 put into address registers R-1 and R-2, the output from memory M-1 is 6 which, as can be seen from Table I, is the code number for a regular year beginning on a Friday. This output is applied via the set of differential input AND gates G-32 to address register R-3 of "read only" memory M-2 (the set of AND gates G-30 is blocked since the YEAR terminal of switch S-6 is open), while at the same time the number 6 in binary form, denoting the month of June, is applied to address register R-4 of memory M-2. Referring to Table III, therefore, with 6 put into each of the address registers R-3 and R-4, the output from memory M-2 is 24 which, as can be seen from Table I, is the code number for a 30-day month beginning on a Tuesday.

Reverting now to the counting-down operation, when down-counter C-2 reaches zero (the same would apply if it was at zero to start with), a signal is applied from its 0 output via lines 82 and 83 to the R terminal of flip-flop FF-2 to reset the same, and via lines 82, 83 and 84 to the last input of AND gate G-7. Thus, with the appropriate calendar code number 24 already available as an output from the "read only"memories, gate G-7 is enabled. This permits a pulse to be applied via lines 85 and 86 to the R terminal of flip-flop FF-1 (which ensures that only a single pulse comes from gate G-7) and via lines 85 and 88 to the preset control AND gates G-9 to G-14 so as to activate the same. As a result, the information transmitted from the "read only" memories M-1 and M-2, i.e. the code number 24, is read into the downcounters C-1 and C-2.

At the same time, the output from gate G-7 is applied via lines 85, 88 and 89 to flip-flop FF-5 to set the same. The resultant output enables AND gate G-3 via lines 90 and 91, so that in turn the first downcounter C-1 is enabled via line 92 to count down from 24 to 0. During this stage, the oscillator output circuit gate 48 is enabled via AND gate G-5 and line 63 to enable pulses, one for each count-down of the downcounter C-1, to be transmitted to the stepping motor 39 via line 64 and gates G-1 and G-15. The motor thus is stepped, now in the clockwise direction, to shift the film strip 37 from its zero or reference position to the counted out state in which the frame containing the image of the desired calendar period identified by the aforesaid code number 24 (a 30-day month beginning on a Tuesday) is in position to be projected on the viewing screen 14. As soon as downcounter C-1 reaches zero, all of these actions are stopped and flip-flop FF-5 is reset by a signal from the 0 output of downcounter C-1 via line 93 and AND gate G-8.

The calendar is now ready for another displaying operation which may be initiated by again depressing the pushbutton 33 as soon as the desired calendar period to be viewed has been "read" into the system by appropriate manipulation of the thumbwheels 21 to 24 and 26.

It will be clear from the foregoing description that if an entire yearly calendar is to be displayed rather than a monthly calendar, for example the calendar for the entire year 1971, the procedure will be the same as above set forth, with one exception. For this case, the switch S-6 (FIG. 6) is set to its first or "YEAR" position, as a result of which the set of differential input AND gates G-32 will be blocked while the set of AND gates G-30 will be enabled. Accordingly, the output from "read only" memory M-1 (in the given example this will be the code number 6 as previously determined and representing a regular year starting on a Friday) will be applied directly to the set of AND gates G-9 to G-14 of the preset control, and no output from the other "read only" memory M-2 is either required or forthcoming.

In like manner, the procedure for the display of either a monthly or a yearly calendar in the Julian calendar will be the same as the appropriate one of those described above for the Gregorian calendar, with the sole exception that the calendar type selector switch S-1 will be in its J position so that the counter C-8 (FIG. 5) is utilized in the calendar period selector circuit 46 (the counter C-7 will be inactive at this time) to divide the number constituted by the thousands and hundreds digits of the year number by 7.

In the Gregorian calendar, however, a special situation exists for the century years, i.e. when the last two digits of a year number date are 00, since not all such years are leap years and, as previously mentioned, the number 00 does not fall into the set of those which cycle every 28 numbers. Accordingly, special addresses must be provided in "read only" memory M-1 for the code numbers corresponding to those years, and thus a number other than those (0 to 27) available from the counter C-9 must be placed into the address register R-2. For the sake of simplicity, the extra number selected for this purpose is 28 and is provided by the permanent register R-5 (FIG. 6) the output of which can be applied to address register R-2 via the set of AND gates G-31. To enable these gates while simultaneously blocking the set of differential input AND gates G-33, the three-input AND gate G-23 is connected to be enabled by the application of signals from the 0 terminals of the decade counters C-5 and C-6 via AND gates G-20 and G-21 and lines 94 and 95, the output of the gate G-23 being applied via line 96 to the sets of gates G-31 and G-33 to enable the former and block the latter, and via line 97 to the differential input AND gate G-26 to block the same. The output of gate G-23 is also applied via line 96*a* to OR gate G-27 the output of which sets flip-flop FF-8 via line 77 in the same manner as when an output is provided by gate G-26. In all other respects, the procedure is the same as described above.

If, after a display operation has been completed, it is desired to turn off the apparatus, the pushbutton 32 is depressed, which opens the ON-OFF switch S-7 and cuts off the power supply 44. The turn-off time delay TD-1 (which may include, for example, a capacitor that is charged while the system is on) now becomes functional and enables the application of a decreasing potential to the negative input AND gate G-18 via line 98 after the power is cut off, for a predetermined time interval of sufficient duration to ensure that an output signal is derived from the gate G-18 to activate the clock gate 48 via lines 99, 60 and 63 and AND gate G-6. This will effect the actuation of the downcounter C-2 via AND gate G-4 in the manner described above and will cause the stepping motor 39 to be stepped counterclockwise via gates G-2 and G-16 so as to return the film strip 37 to its zero position.

It will be understood, of course, than whenever the ON-OFF switch S-7 is open and is then closed by depression of pushbutton 32 to apply AC power to the DC power supply 44, the initial current provided by the latter is applied via line 100 to the multivibrator 54 (FIG. 3) and trips the latter to emit a pulse resetting all flip-flops, non-permanent registers and counters, to assure they all start at the proper state. Concurrently, the clock 47 is activated via lines 100 and 101. Under these circumstances, therefore, the secondary reset 55 will not have to perform its normal functions, previously described, upon closing of the display switch S-8. On the other hand, when a second display operation is performed subsequent to a first such operation but without the ON-OFF switch S-7 being opened and reclosed between the two cycles, the master reset 54 remains nonfunctional and all resetting functions are carried out by the secondary reset 55.

By way of an example of an alternative approach to the attainment of the objectives of the present invention, a calculator type calendar period selector circuit 46' (FIGS. 7, 8 and 9) may be utilized in lieu of the "read only" memory type circuit 46. In this embodiment of the invention, the circuit 46' includes: the four decade counters with 10 decoded decimal outputs C-3 to C-6, and their associated year number selector switches S-2 to S-5 (FIG. 7), and the month selector switch S-6 (FIG. 9); a plurality of AND gates G-34 (FIG. 7), G-35 to G-40 (FIG. 8), and G-41 to G-43 (FIG. 9); OR gates G-44 and G-45 (FIG. 8); differential input AND gates G-46 to G-48 (FIG. 9); multiple AND gate sets G-49 (FIG. 7) and G-50 (FIG. 8); a multiple differential input AND gate set G-51 (FIG. 8); a flip-flop FF-9 (FIG. 7); a 14-bit counter C-10 (FIG. 7); a year number-retaining register R-6 (FIG. 8); a calculation register generally designated R-7 (FIGS. 8 and 9) which, for the sake of simplicity, is shown in a plurality of sections R-7*a*, R-7*b* and R-7*c*, since different sections of this register are used at different times or under different circumstances, but which is actually a single register; and a plurality of addition, substraction and division circuits (FIGS. 8 and 9) of conventional configuration and thus designated only by arithmetic symbols indicating their respective functions. The two columns of numbers shown under the headings G and J adjacent the year number-retaining register R-6 indicate, for either type of calendar, how many times the output from that register is used, as well as the sequence of the various calculations performed. Proper sequencing of the operations here are accomplished by means of any suitable controller (not shown) and/or by the serial and/or parallel connections (not shown) between the circuits. The vertical broken lines in the register sections R-7*b* and R-7*c* indicate the point following a given sequence of calculations at which the register R-7 must be cleared before the next set of data is inserted thereinto. The interconnections between the display system control circuit 45 and the calendar period selector circuit 46' are, however, essentially the same as in the case of the "read only" memory type selector circuit 46 and thus have been designated by the same reference numerals.

In the operation of the perpetual calendar according to this embodiment of the present invention, as before, with the ON-OFF switch S-7 closed and the control circuit 45 rendered operational in the manner already described, the thumbwheel switches S-2 to S-5 are manipulated to the respective digit settings for the year desired, the thumbwheel switch S-6 is manipulated to either its "YEAR" position if a yearly calendar is to be displayed or to the setting of a particular month if a monthly calendar is to be displayed, and the year type selector switch S-1 is moved to either its G or its J position depending on whether a calendar period in the Gregorian or the Julian calendar is to be displayed. Again let it be assumed that the calendar for February 1972 (Gregorian) has been displayed, so that the conditions previously outlined herein with respect to the states of the stepping motor 39 and the downcounters C-1 and C-2 obtain, and that it is now desired to obtain a display of the calendar for April 1927 (Gregorian).

The functioning of the circuitry to this end is as follows:

When the pushbutton 33 is depressed to close the display initiating switch S-8, the stepping motor is operated, as previously described, to shift the film strip 37 so as to return the zero or reference frame thereof to the projection system. Concurrently, with the clock 47 providing the pulses for operating the counters C-3 to C-6 and the counter C-10, the year number is read into register R-6 via the set of AND gates G-49. The number thus read into the register R-6 is then subjected to four calculations.

First, as indicated by the numeral 1 in the G column next to register R-6, the number 1927 is divided by 4. This places the number 481 (the quotient) into register R-7 via line 102 and AND gate G-37. The remainder is tested via line 103 and AND gate G-38 for being either zero or not zero $(\overline{0})$. In this case, the reminder is 3 (its presence automatically indicates a non-leap or regular year) and generates an output at the $\overline{\mathbf{0}}$ terminal of a suitable circuit 104, which output is passed via line 105 to OR gate G-45. This causes an additional number 1 to be read via line 106 into the register R-7 and added to 481, so that the register now contains the number 482.

Second, as indicated by the numeral 2 in the said G column, the number 1927 is divided by 100. The quotient 19 is fed via line 107 into register R-7 and subtrated from the number already there, so that 463 remains in the register. Since the remainder is 27, i.e. again not zero $(\overline{0})$, a signal is generated at the $\overline{\mathbf{0}}$ terminal of a circuit 108 and is applied to AND gate G-39, but this gate remains blocked since no signal indicating a 0 remainder was derived from the circuit 104.

Third, the number 1927 is divided by 400. The quotient 4 is added via line 109 to the previously obtained number 463 in register R-7 so that the number retained in the register is 467. Since the remainder again is not zero, a signal is generated at the $\overline{\mathbf{0}}$ terminal of a circuit 110 and is applied via $\overline{\mathbf{0}}$ line 111 to AND gate G-40, but the latter remains blocked since the remainder from the division by 100 was not zero. OR gate G-44 thus remains inactive and no leap year signal is generated.

Fourth, the numbers 1927 (from register R-6) and 467 (from register R-7) and a number 6 are now added together (see lines 112 and 112*a*), giving a total of 2,400. It should be noted that the addend 6 is required only because of the particular arrangement of code numbers used in Table I, but could be omitted if that table were developed accordingly. At this point, i.e. prior to any further operation, the register R-7 is cleared. The number 2400 is then divided by 7 (see line 113), and a number 7, constituted by the remainder 6 and an added number 1, is inserted via line 114 into register R-7. Referring to Table I, it will be seen that 7 is the code number for a regular year starting on a Saturday, which is the case for the year 1927 (Gregorian).

With selector switch S-6 set on its fifth or "APRIL" position, AND gates G-50 are blocked but the differential input AND gates G-51 are enabled, permitting the number 7 to be retained in register R-7 for further calculations. By virtue of the energization of lines 115 and 116 as a function of the position of selector switch S-6, the number 5 is added to the number 7, so that the number in the register becomes 12. This number is now divided by 7, the register R-7 is then cleared, and the remainder 5 plus an added number 1 is reinserted into the register via line 117, so that the number in the register is 6. The signal in line 115 also enables the differential input AND gate G-47 and thus effects the addition of a number 21 via line 118 to the number in the register, yielding a final number 27. Referring again to Table I, it is seen that 27 is the code number for a 30-day month starting on a Friday, which is the case for the month of April 1927 (Gregorian).

As mentioned before in connection with the calculations on the number in register R-6, the proper sequencing of the various operations on the numbers in register R-7 is, of course, accomplished by suitable controllers or other appropriate expedients (not shown).

The code number 27 now is transmitted to the preset control AND gates G-9 to G-14 so that, when the latter are enabled upon application of a pulse from gate G-7 via lines 85 and 88 in response to the application of pulses from flip-flop FF-9 to gate G-7 via lines 78 and 79, all as previously described, the code number is read into the downcounters C-1 and C-2. When downcounter C-1 is then enabled by a pulse from flip-flop FF-5, as also described above, the stepping motor 39 is driven so as to shift the appropriate frame of the film strip 37 into the projection system 38 for display of the desired monthly calendar on the screen 14.

It will be understood, of course, that if it had been desired to display the entire yearly calendar for the year 1927, the switch S-6 would have been positioned on its first or "YEAR" position. The resultant signal via line 119 would then have blocked the differential input AND gates G-51 while enabling the AND gates G-50, thereby to permit the signal corresponding to the code number 7 inserted into register R-7 via line 114 to be transmitted directly to the preset control AND gates G-9 to G-14.

Figure 8:
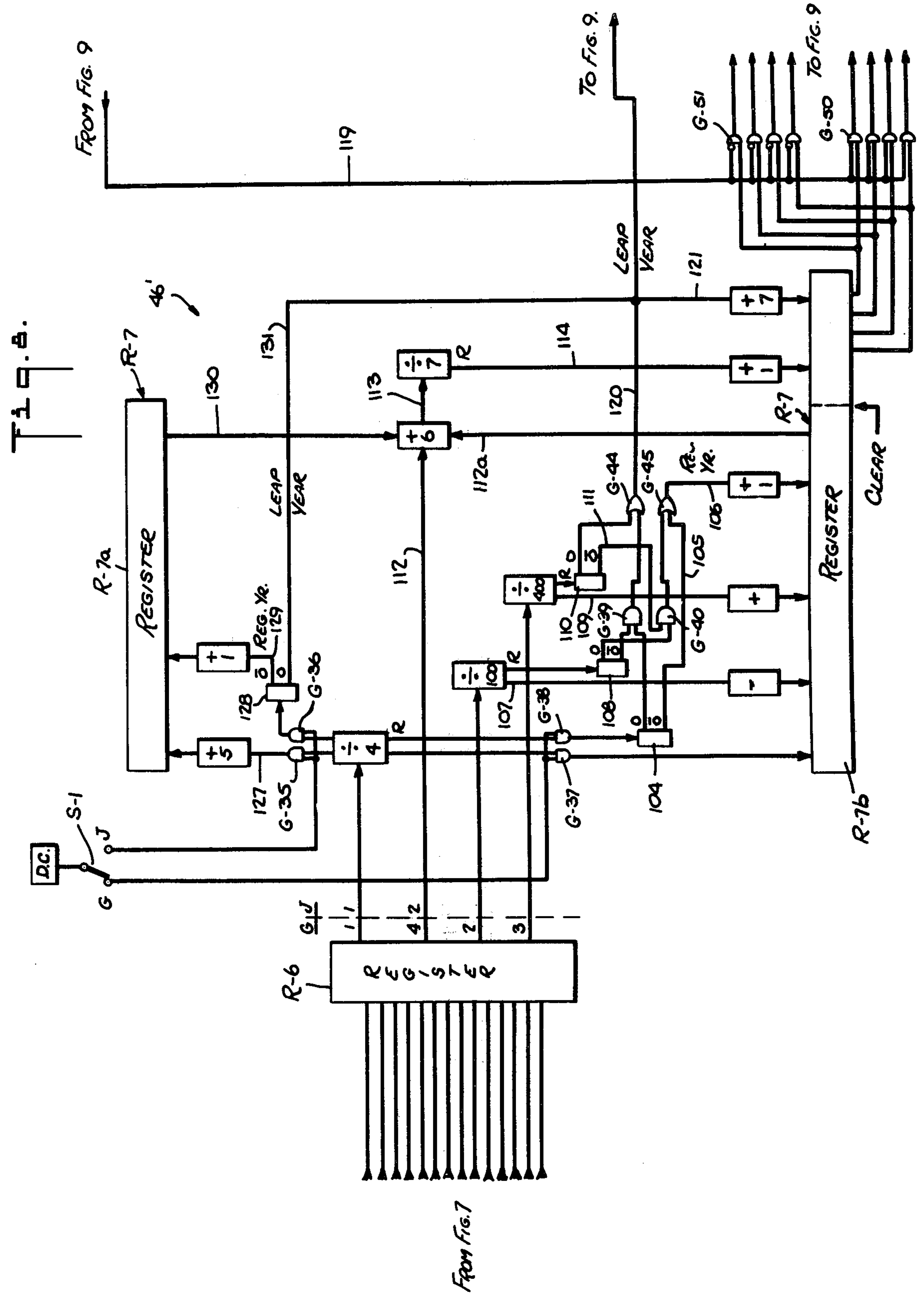
Figure 9:
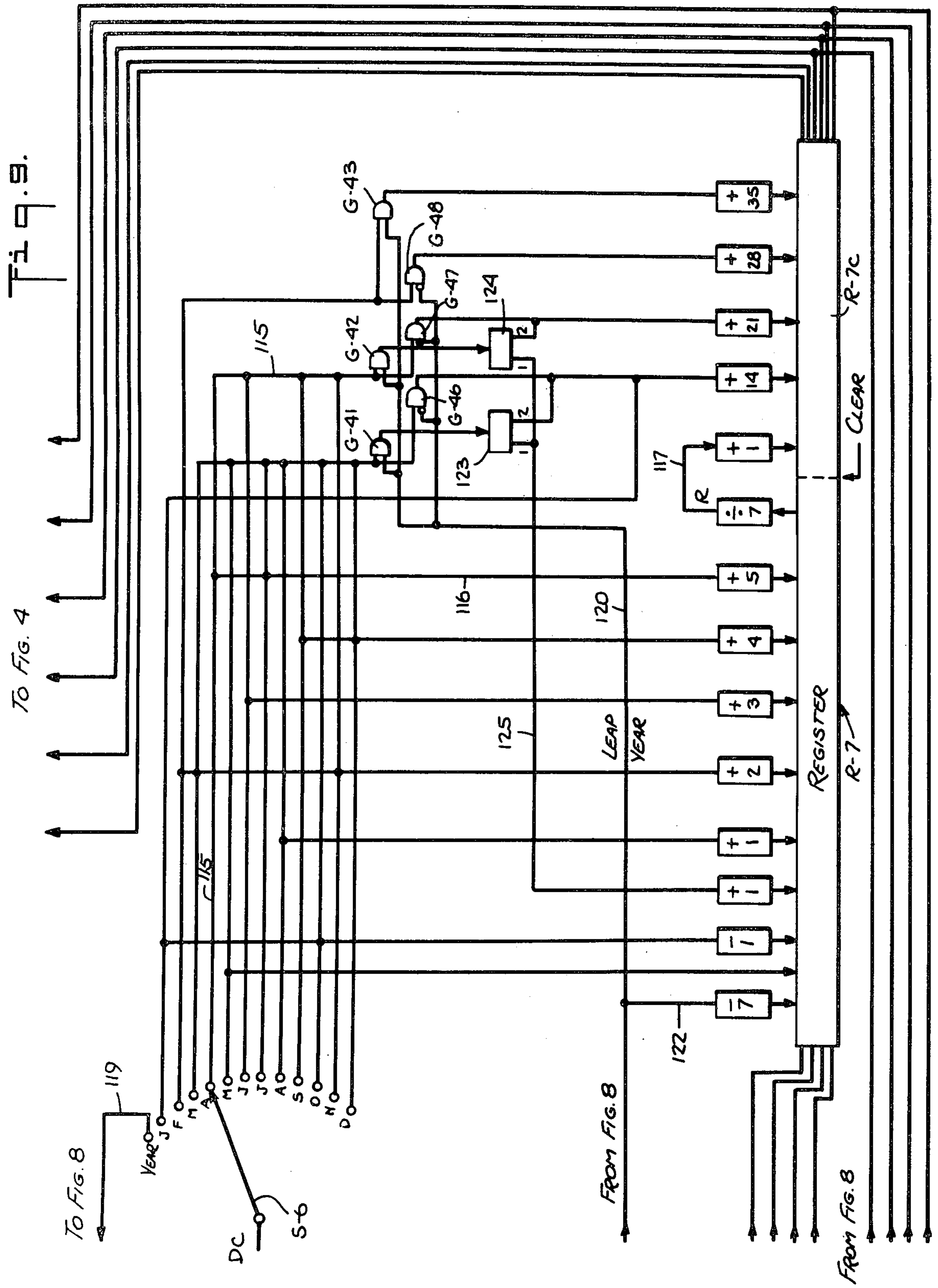

The code number calculating operations for other years will be evident from the foregoing representative description and the notations used in FIGS. 8 and 9 and thus will not be set forth herein in detail. The three divisions by 4, 100 and 400 are, of course, designed to determine the leap year situation which is complicated by the fact that in the Gregorian calendar not all years divisible by 4, nor even all years divisible by both 4 and 100, are leap years. It will be understood that for any non-century year which is a leap year, the remainder of the first division operation will always test out to be 0, and that for a century year which is a leap year both the second and the third divisions must also yield a 0 remainder, so that a signal will ultimately be emitted by OR gate G-44 and applied via line 120 to AND gates G-41 to G-43 to enable the same (if needed for a monthly calendar period display) and via lines 120, 121 and 122 to register R-7 to effect the indicated addition and subtraction operations. It should also be noted that whenever one or the other of the AND gates G-41 and G-42 is unblocked, an associated circuit 123 or 124 will emit two signals in sequence (as designated by the proximate numerals 1 and 2) to effect the addition first of the number 1 via line 125 and then of either the number 14 or the number 21 via either line 126 or line 118 to the number in register 7 at the respective time.

Assuming now that the same calendar period is to be displayed but in the Julian calendar, the calendar type selector switch S-1 is moved to its J position. With the switch S-1 in this position, AND gates G-37 and G-38 are blocked while AND gates G-35 and G-36 are enabled. Only two calculations are then performed on the year number retained in register R-6 (the divisions by 100 and 400 are not needed in this case, since every fourth year is a leap year).

First, the year number in register R-6 is divided by 4, and the quotient of this division, i.e. 481, with an additional number 5 added to it is inserted via line 127 into register R-7, so that the number in register R-7 is 486. At the same time, the remainder of the division is tested for being zero or not zero ($\overline{0}$) via AND gate G-36. Here the remainder is not zero, and thus a signal is generated at the $\overline{0}$ terminal of a circuit 128, which causes an additional number 1 to be added to the number in the register via line 129, making that number 487.

Second, the numbers 1927 (from register R-6), 487 (from register R-7) and 6 are added together (see lines 112 and 130), giving a total of 2,420. From this point, the operation proceeds as outlined above for the fourth calculation of the Gregorian calendar year. Thus, register R-7 is cleared, the number 2,420 is then divided by 7 (see line 113), and a number 6, constituted by the sum of the remainder 5 and an additional 1, is inserted into register R-7 via line 114. Again, reference to Table I shows that 6 is the code number for a regular year starting on a Friday, which is the case for the year 1927 (Julian).

Since the selector switch S-6 is set on its fifth or "APRIL" position, the number 6 is retained in register R-7 for further calculations. (Should a yearly calendar period display be desired, of course, these calculations would not be necessary and register section R-7*c* would simply be bypassed.) As before, therefore, the number 5 is added via lines 115 and 116 to the number in the register, so that the number in the register becomes 11. This number is now divided by 7, register R-7 is then cleared, and the remainder 4 plus an added number 1 is reinserted into the register via line 117, so that the number in the register is 5. The signal in line 115 also enables the differential input AND gate G-47 and thus effects the addition of a number 21 via line 118 to the number in the register, yielding a final number 26. Referring again to Table I, it is seen that 26 is the code number for a 30-day month starting on a Thursday, which is the case for the month of April 1927 (Julian). This code number 26 is then transmitted to the preset control AND gates G-9 to G-14 so that it is ultimately read into the downcounters C-1 and C-2 and causes the stepping motor 39 to be driven so as to shift the appropriate frame of the film strip 37 into the projection system.

Reverting now to the initial division by 4, if the remainder tests out to be zero, then the year must be a leap year and a signal is generated at the 0 terminal of the circuit 128, so that an additional number 7 is added via lines 131 and 121 to the number which is already in register R-7 as the result of the preceding three-number addition, the division of that sum by 7, and the addition of 1 to the remainder of that division. At the same time, where a monthly calendar period is to be displayed, the said zero signal effects a subtraction of 7 via lines 131, 120 and 122 from the previously enlarged number in register R-7 in proper sequence, and enables AND gates G-41 to G-43 via lines 131 and 120 to effect the addition of the required ones of the numbers 1, 14, 21 and 35 in proper sequence at the appropriate times to the numbers then in register R-7.

As will be apparent, any presettable calendar period selector circuit embodying the principles of the present invention may be constructed alone as a hardware module which will be applicable to any electronic calendar system in which the most efficient selection of any yearly and/or monthly calendar period to be displayed is desired.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A calendar period selector circuit for an electronic perpetual calendar intended for displaying selected yearly or monthly calendar periods for any year in a given span of years falling between the year 0 and the year 9,999 in either the Gregorian or the Julian calendar, comprising:

A. signal generating means for providing electronic input signals corresponding to the available span of year numbers and the twelve months of the year, said signal generating means including first and second pairs of decade counters, each with 10 decoded decimal outputs, connected so as to have each pair able to count from 0 to 99 to represent, in the one case a first two-digit number constituted by the thousands and hundreds digits of any selected year number, and in the other case a second two-digit number constituted by the tens and units digits of any selected year number, B. selector switch means settable to respective control positions to provide for the derivation, from said signal generating means, of specific input signals corresponding, for either type of calendar, to the number of the year desired or to the name of the month plus the number of the year desired, and C. logic circuit means responsive to said specific input signals for providing corresponding output signals, said logic circuit means including first and second counters arranged to divide said first number by 4 and by 7, respectively, said first counter being activatable only for a Gregorian calendar period display and said second counter being activatable only for a Julian calendar period display, a third counter arranged to divide said second number by 28, and a first memory having first and second address registers and 203 addresses at each of which is located a respective code number designating a respective one of the fourteen available yearly calendar periods, each of said first and second counters being connected to apply its respective output to said first address register only when that counter is activated, and said third counter being connected to apply its output to said second address register.

2. A calendar period selector circuit according to claim 1, wherein said selector switch means further comprises a calendar type selector switch arranged to enable said first counter for a Gregorian calendar period display only and to enable said second counter for a Julian calendar period display only.

3. A calendar period selector circuit according to claim 2, wherein said logic circuit means further comprises a second memory having third and fourth address registers and 168 addresses at each of which is located a respective code number designating a respective one of the twenty-eight available monthly calendar periods, the output connections of said first memory being arranged to apply the code number output of the latter either to a control circuit for a calendar period display system or to said third address register, a source of twelve binary number signals each corresponding to a respective one of the months of the year connected to said fourth address register, and wherein said selector switch means further comprises a month/year selector switch arranged either, if a monthly calendar period display is desired, to permit the application of the code number output of said first memory to said third address register jointly with the application of the output of said binary number signal source to said fourth address register for providing a monthly calendar period code number output from said second memory to be applied to said control circuit, or if a yearly calendar period display is desired, to permit the application of the yearly calendar period code number output of said first memory exclusively to said control circuit.

4. A calendar period selector circuit according to claim 3, wherein said logic circuit means further comprises a permanent register connected to apply an output, representing a fixed number other than any of the numbers available from said third counter, to said second address register for accessing the addresses of code numbers designating only century years, and gate means responsive, upon said calendar type selector switch being set for the Gregorian calendar, to signals from said second pair of decade counters corresponding to said second number being 00 for enabling said permanent register and concomitantly blocking the output of said third counter from said second address register.

5. A logic circuit module for use in a calendar period selector circuit for an electronic perpetual calendar intended for displaying selected yearly or monthly calendar periods for any year in a given span of years falling between the year 0 and the year 9,999 in either the Gregorian or the Julian calendar, said logic circuit module comprising:

A. first and second electronic counters arranged, respectively, to receive electronic signal inputs corresponding to, and to divide by 4 and by 7, a first two-digit number constituted by the thousands and hundreds digits of any selected year number, said first counter being activatable only for a Gregorian calendar period display and said second counter being activatable only for a Julian calendar period display, B. a third counter arranged to receive electronic signal inputs corresponding to, and to divide by 28, a second two-digit number constituted by the tens and units digits of any selected year number, and C. a first memory having first and second address registers and 203 addresses at each of which is located a respective code number designating a respective one of the fourteen available yearly calendar periods, each of said first and second counters being connected to apply its respective output to said first address register only when that counter is activated, and said third counter being connected to apply its output to said second address register.

6. A logic circuit module according to claim 5, further comprising a second memory having third and fourth address registers and 168 addresses at each of which is located a respective code number designating a respective one of the 28 available monthly calendar periods, the output connections of said first memory being arranged to apply the code number output thereof either to a control circuit for a calendar period display system or to said third address register, and a source of twelve binary number signals each corresponding to a respective one of the months of the year connected to said fourth address register, whereby if a monthly calendar period display is desired, the code number output of said first memory is applied to said third address register jointly with the application of the output of said binary number signal source to said fourth address register for providing a monthly calendar period code number output from said second memory to be applied to said control circuit, or if a yearly calendar period display is desired, the code number output of said first memory is applied exclusively to said control circuit.

7. A logic circuit module according to claim 6, further comprising a permanent register connected to apply an output, representing a fixed number other than any of the numbers available from said third counter, to said second address register for accessing the addresses of code numbers designating only century years, and gate means responsive to signal inputs corresponding to said second number being 00 in a Gregorian calendar year for enabling said permanent register and concomitantly blocking the output of said third counter from said second address register.

8. A calendar period selector circuit for an electronic perpetual calendar intended for displaying selected yearly or monthly calendar periods for any year in a given span of years falling between the year 0 and the year 9,999 in either the Gregorian or the Julian calendar, comprising:

A. signal generating means for providing electronic input signals corresponding to the available span of year numbers and the twelve months of the year, said signal generating means including first and second pairs of decade counters, each with 10 decoded decimal outputs, and a 14-bit counter connected so as to be able to count from 0 to 9,999 to represent any selected year number, B. selector switch means settable to respective control positions to provide for the derivation, from said signal generating means, of specific input signals corresponding for either type of calendar, to the number of the year desired or to the name of the month plus the number of the year desired, and C. logic circuit means responsive to said specific input signals for providing corresponding output signals, said logic circuit means including a first register for receiving electronic signal inputs corresponding to, and for retaining, any selected year number from the available span of year numbers and for providing a corresponding year number output, gate means connected with said counters and said first register for enabling said selected year number represented by corresponding electronic signal inputs from said signal generating means to be selectively placed into said first register, and electronic calculator means programmed to perform a series of mathematical operations to transform said year number outputs of said first register into respective code numbers each designating a respective one of the available calendar periods, said calculator means including a second register, three first division circuits operable for dividing by 4, by 100 and by 400, respectively, said first division circuits being connected between said first and second registers for sequentially receiving as identical inputs from said first register each year number output thereof and for individually providing both a quotient output as an input to said second register and an either zero or not-zero remainder output as a test of whether the year to be displayed is a leap year or not a leap year, all of said first division circuits being activatable for a Gregorian calendar period display and only that one of said first division circuits which divides by 4 being activatable for a Julian calendar period display, and a plurality of addition, subtraction and second division circuits operatively connected with said second register and operable in sequence for correspondingly modifying either a number which at the time of such operation is being placed into said second register or a number which at the time of such operation is already in said second register as the result of a prior operation of said circuits, said second register upon completion of all such operations providing said output signals.

9. A calendar period selector circuit according to claim 8, wherein said selector switch means further comprises a calendar type selector switch arranged to effect the activation of said first division circuits either for a Gregorian calendar period display only or for a Julian calendar period display only.

10. A logic circuit module for use in a calendar period selector circuit for an electronic perpetual calendar intended for displaying selected yearly or monthly calendar periods for any year in a given span of years falling between the year 0 and the year 9,999 in either the Gregorian or the Julian calendar, said logic circuit module comprising:

A. a first register for receiving electronic signal inputs corresponding to, and for retaining, any selected year number from the available span of year numbers and for providing a corresponding year number output, and B. electronic calculator means programmed to perform a series of mathematical operations to transform said year number outputs of said first register into respective code numbers each designating a respective one of the available calendar periods, said calculator means including a second register, three first division circuits operable for dividing by 4, by 100 and by 400, respectively, said first division circuits being connected between said first and second register for sequentially receiving as identical inputs from said first register each year number output thereof and for individually providing both a quotient output as an input to said second register and an either zero or notzero remainder output as a test of whether the year to be displayed is a leap year or not a leap year, all of said first division circuits being activatable for a Gregorian calendar period display and only that one of said first division circuits which divides by 4 being activatable for a Julian calendar period display, and a plurality of addition, subtraction and second division circuits operatively connected with said second register and operable in sequence for correspondingly modifying either a number which at the time of such operation is being placed into said second register or a number which at the time of such operation is already in said second register as the result of a prior operation of said circuits, said second register upon completion of all such operations providing output signals representing said code numbers.

* * * * *

PO-1050
(5/69)

UNITED STATES PATENT OFFICE
CERTIFICATE OF CORRECTION

Patent No. 3,916,172 Dated October 28, 1975

Inventor(s) Ralph L. Engle, Jr.

It is certified that error appears in the above-identified patent and that said Letters Patent are hereby corrected as shown below:

Column 1, line 39, delete "thousands, excluding". Column 2, line 7, for "Juian" read --Julian--; line 8, for "Julian" read --which--. Column 4, line 38, for "1st" read --last--. Column 6, line 25, for "throug" read --through--; line 46, for "(FIG. 30" read --(FIG. 3)--. Column 13, line 36, for "0" read --$\bar{0}$--.

Signed and Sealed this

*third* Day of *February 1976*

[SEAL]

*Attest:*

RUTH C. MASON
*Attesting Officer*

C. MARSHALL DANN
*Commissioner of Patents and Trademarks*